United States Patent Office 3,154,551
Patented Oct. 27, 1964

3,154,551
4-PIPERAZINO-5-ARYLMERCAPTO PYRIMIDINES
George H. Hitchings, Yonkers, and Barbara Roth, Scarsdale, N.Y., assignors to Burroughs Wellcome & Co. (U.S.A.), Tuckahoe, N.Y., a corporation of New York
No Drawing. Filed Sept. 20, 1962, Ser. No. 225,147
Claims priority, application Great Britain Mar. 17, 1959
8 Claims. (Cl. 260—256.5)

The present invention relates to new pyrimidine derivatives and the manufacture thereof. This application is a continuation-in-part of applications Serial Nos. 14,563, filed March 14, 1960 and now abandoned and 21,095, filed April 11, 1960 and now abandoned.

It has been discovered that compounds of Formula I and salts thereof lower the systolic and diastolic blood pressure when administered to experimental animals.

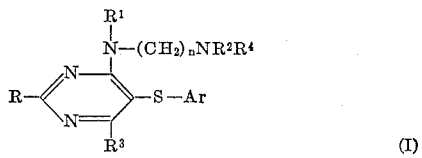

and its therapeutically acceptable acid addition salts, wherein R is selected from the class consisting of hydrogen, amino and lower alkylamino, $R^1$, $R^2$ and $R^4$ are selected from the class consisting of lower alkyl and hydrogen and $R^1$ and $R^2$ are joined to form piperazino, $n$ has values of 2 and 3, $R^3$ is selected from the class consisting of hydrogen and lower alkyl and Ar is a phenyl group.

The phenyl group may be unsubstituted or may contain as substituents halogen, lower alkyl and lower alkoxy. The halogens may be chloro, iodo, fluoro or bromo. The lower alkyl groups may be of the general class methyl, ethyl, propyl, butyl and the like. The alkoxy groups may be methoxy, ethoxy, propoxy, butoxy and the like.

The compounds of Formula I are prepared by the reaction of a compound of Formula II with an amine of formula $HNR^1(CH_2)_nNR^2R^4$, or, when $R^1$ and $R^2$ are joined to form a piperazino group, with an N-alkoxycarbonylpiperazine followed by the removal of the alkoxycarbonyl group by alkaline hydrolysis, or with an $R^4$ piperazine.

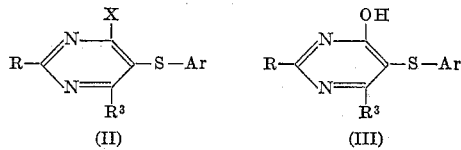

In this formula X is a reactive grouping such as a chlorine, bromine or iodine atom.

Compounds of Formula II may be prepared from compounds of Formula III. Compounds of Formula II having X as a chlorine atom are conveniently prepared by reacting a compound of Formula III with phosphoryl chloride. The crude primary product of this chlorination appears to be a complex containing phosphorus, from which the pure compound of Formula II is liberated by mild alkaline hydrolysis. The unhydrolyzed crude products themselves react readily with amines of formula $HNR^1R^2$ to produce compounds of Formula I, and are regarded for the purpose of the present invention as included among the compounds of Formula II.

The following examples illustrate the invention.

EXAMPLE 1

2 - Amino - 4 - Hydroxy - (or 2,4 - Dihydroxy) - 5 - Arylmercaptopyrimidines. General Method. Via 5-Bromopyrimidine Condensations The appropriate thiophenol was condensed with 5-bromoisocytosine or 5-bromouracil by heating to 140–160° in ethylene glycol for 1 to 3 hours in the presence of potassium carbonate. A nitrogen atmosphere was employed to minimize disulfide formation. Upon cooling at the end of the reaction period, the disulfide of the mercaptan precipitated as a by-product of the reaction. This was separated by filtration. By adding several volumes of water to the filtrate and neutralizing with acid, the product precipitated and left the by-products isocytosine or uracil in solution. Any residual thiophenol was removed by extracting the product with alcohol or ether. After reprecipitation from alkali, the pyrimidine was sufficiently pure for subsequent reactions. This method is exemplified below by the preparation of 2 - amino - 4 - hydroxy - 5 - (p - chlorophenylmercapto)-pyrimidine.

EXAMPLE 2

2-Amino-4-Hydroxy-5-(p-Chlorophenylmercapto)-Pyrimidine (a) From 5-bromoisocytosine.—A mixture of 100 g. (0.525 mole) of 5-bromoisocytosine, 76 g. (0.525 mole) p-chlorothiophenol, 73 g. (0.53 mole) anhydrous potassium carbonate, and 1 liter of ethylene glycol, contained in a two-liter flask equipped with stirrer condenser, and gas inlet tube, was heated to 150–155° for three hours in an atmosphere of nitrogen. Evolution of carbon dioxide occurred as the reaction temperature reached approximately 100°, and complete solution was obtained between 150–155°. When the temperature dropped slightly below this point, a second liquid phase began to separate. At the end of the heating period, the mixture was allowed to cool to room temperature. An oil settled out at the bottom of the flask, which solidified on cooling. The reaction mixture was filtered. The precipitate was recrystallized from ethanol or hexane, and then melted at 70°. It was insoluble in dilute sodium hydroxide. The analysis indicated that it was 4,4'-dichlorodiphenyl disulfide. The filtrate from the reaction mixture was poured into approximately five volumes of water, followed by neutralization with hydrochloric acid, which yielded a white precipitate. This was filtered off and reprecipitated from alkali. It was then extracted with warm ethanol and ether to remove any unreacted thiophenol, followed by a final reprecipitation from alkali. The product (2-amino-4-hydroxy-5-(p-chlorophenylmercapto)-pyrimidine) melted at 320°.

(b) From ethyl α - formyl - α - (p - chlorophenylmercapto) - acetate.—Ethyl α - (p - chlorophenylmercapto)-acetate was formylated by reaction with two moles of ethyl formate in the presence of two moles of sodium ethylate. The formyl derivative melted at 41° after recrystallization from hexane.

The formylated ester (4.2 g., 0.016 mole) was treated with an excess of diazomethane in ether to convert it to ethyl α - ethoxymethylene - α - (p - chlorophenylmercapto)-acetate. The product was obtained as a syrup which was converted directly to the pyrimidine by reaction with an equivalent of guanidine (obtained from 1.53 g. guanidine hydrochloride plus 0.37 g. of sodium in 40 ml. of absolute alcohol). This mixture was refluxed for six hours, followed by removal of the solvent. The residue was extracted with alkali, and the soluble portion neutralized with acid. A white precipitate was formed, which was isolated and washed with acetone and ether. The product had physical properties which were identical with those of the product obtained by Example 2(a).

EXAMPLE 3

*2-Amino-4-Alkylamino-(or 2,4-Bis-Alkylamino)-5-Arylmercaptopyrimidines. General Method*

The aminohydroxy- or dihydroxypyrimidines obtained in the previous step were heated in an excess of phosphorus oxychloride until the pyrimidine was all in solution, followed by removal of excess phosphorus oxychloride. The residual syrup was poured on ice, and neutralized with sodium carbonate. The product was obtained usually as a phosphorus complex of the chlorinated pyrimidine which slowly decomposed in alkali. The pure chloro derivative could be isolated from this, if desired, by extraction of the product with hot benzene or sometimes hexane. However, it was usually found more convenient to use the crude phosphorus complex directly in subsequent reactions with amines.

For reactions with high boiling amines, the chlorinated pyrimidine was simply boiled with an excess of the amine for several hours. The excess amine can be recovered, if desired, by distillation. The product was obtained on adding water or alkali to the residue. Usually it was obtained as a gum which gradually solidified after washing with fresh portions of water. In the cases where the gummy products did not crystallize, they were converted to the hydrochloride in alcohol, and recrystallized from this medium, or from alcohol-ether. The free bases were recrystallized from alcohol, alcohol-water mixtures, or from ethyl acetate.

Reactions in which the volatile amines (methyl- or dimethylamine) were employed were carried out with a several-fold excess of the amine in alcoholic medium in an autoclave at 120–130° for 16 hours. These reactions are exemplified below.

EXAMPLE 4

*2-Amino-4-Chloro-5-(p-Chlorophenylmercapto) Pyrimidine*

A mixture of 2.5 g. of 2-amino-4-hydroxy-5-(p-chlorophenylmercapto)pyrimidine and 20 ml. of phosphorus oxychloride was heated to refluxing until all of the pyrimidine had dissolved. Approximately two hours was required. Excess phosphorus oxychloride was distilled off, and the residue poured on ice and neutralized with sodium carbonate. A cream colored solid separated. Upon standing, the mixture slowly became acidic, and the character of the precipitate seemed to change. It was allowed to stand for two hours in the cold, and repeatedly neutralized before filtration. The crude product gradually melted and decomposed between 200–260°. The substance was extracted with hot benzene. The soluble portion yielded a white precipitate on cooling; this melted at 208° (dec.).

EXAMPLE 5

*2,4-Dichloro-5-(p-Chlorophenylmercapto)Pyrimidine*

A mixture of 7.4 g. of 2,4-dihydroxy-5-(p-chlorophenylmercapto)-pyrimidine and 60 ml. of phosphorus oxychloride was refluxed for 8 hours, at which time practically all of it had dissolved. The mixture was filtered through sintered glass, and the crude product isolated by the procedure above. This was extracted with boiling hexane. On cooling, the product crystallized as large off-white needles which weighed 5.3 g. and melted at 100–102°.

EXAMPLE 6

*2-Amino-4-(N'-Methyl-N-Piperazino)-5-p-Chlorophenylmercaptopyrimidine*

Crude 2-amino-4-chloro-5-p-chlorophenylmercaptopyrimidine (10 g.) was mixed with N-methylpiperazine (25 ml.). An initial exothermic reaction occurred. The mixture was then heated under reflux for three hours. On cooling a heavy precipitate formed. The mixture was slurried in water and filtered. The pricipitate was washed well with water, recrystallized once from ethanol, and treated with ethanolic HCl to give the dihydrochloride of 2 - amino - 4 - (N' - methyl - N - piperazino) - 5 - p - chlorophenylmercaptopyrimidine, which melted at 238° C. after two recrystallizations from ethanol-ether mixtures. The substance had ultraviolet absorption maxima at 223 mµ ($E_m$=25,000) and 250 mµ ($E_m$=19,000) at pH 1, and at 254 mµ ($E_m$=16,200) with a slight shoulder at 300 mµ ($E_m$=11,450) at pH 11.

EXAMPLE 7

*2-Amino-4-Dimethylaminoethylamino-5-p-Chlorophenylmercaptopyrimidine*

2 - amino - 4 - chloro - 5 - p - chlorophenylmercaptopyrimidine (10 g.) was treated with N,N-dimethylethylenediamine (25 ml.) in the same manner to yield 2-amino-4 - dimethylaminoethylamino - 5 - p - chlorophenylmercaptopyrimidine, which melted at 101–103° C. after recrystallization from ethanol.

EXAMPLE 8

*2-Amino-4-Dimethylaminopropylamino-5-p-Chlorophenylmercaptopyrimidine*

2 - amino - 4 - chloro - 5 - p - chlorophenylmercaptopyrimidine (10 g.) was treated with N,N-dimethylpropylenediamine (25 ml.) in the same manner to give 2-amino - 4 - dimethylaminopropylamino - 5 - p - chlorophenylmercaptopyrimidine, which melted at 119–120° C. after recrystallization from diluted ethanol.

EXAMPLE 9

*2-Amino-4-N'-Methylpiperazino-5-p-Methylphenylmercaptopyrimidine*

2 - amino - 4 - hydroxy - 5 - p - methylphenylmercaptopyrimidine was chlorinated and the product treated with N-methylpiperazine in the manner described above to yield 2 - amino-4-N'-methylpiperazino-5-p-methylphenylmercaptopyrimidine, which melted at 145° C. after recrystallization from ethanol.

EXAMPLE 10

*2-Amino-4-N'-Methylpiperazino-5-m-Methylphenylmercaptopyrimidine*

2 - amino - 4 - hydroxy - 5 - m - methylphenylmercaptopyrimidine was chlorinated and the product reacted with N-methylpiperazine as described above to yield 2-amino-4 - N' - methylpiperazino - 5 - m - methylphenylmercaptopyrimidine, which melted at 135–136° C. after recrystallization from ethanol.

EXAMPLE 11

*2-Amino-4-N'-Methylpiperazino-5-o-Methylphenylmercaptopyrimidine*

2 - amino - 4 - hydroxy - 5 - o - methylphenylmercaptopyrimidine was chlorinated and the product reacted with N-methylpiperazine as described above to yield 2-amino- 4 - N' - methylpiperazino - 5 - o - methylphenylmercapto-pyrimidine, which melted at 115–116° C. after recrystallization from ethyl acetate.

EXAMPLE 12

2-Amino-4-N'-Methylpiperazino-5-Phenylmer-captopyrimidine

Similarly, 2-amino-4-hydroxy-5-phenylmercaptopyrimidine was chlorinated to yield 2-amino-4-chloro-5-phenylmercaptopyrimidine, melting point 189–192° C., which was reacted with N-methylpiperazine to form 2-amino-4-N'-methylpiperazino-5-phenylmercaptopyrimidine, melting point 133–134° C. after recrystallization from ethanol.

EXAMPLE 13

2-Amino-4-N'-Methylpiperazino-5-Trichloro-phenylmercaptopyrimidine

2 - amino - 4 - hydroxy - 5 - trichlorophenylmercaptopyrimidine was chlorinated and the product reacted with N-methylpiperazine as described above to yield 2-amino-4 - N' - methylpiperazino - 5 - trichlorophenylmercaptopyrimidine, which crystallized from ethanol in long white needles, melting point 181–183° C.

EXAMPLE 14

2-Amino-4-Piperazino-5-p-Chlorophenyl-Mercapto-pyrimidine

A mixture of 2-amino-4-chloro-5-p-chlorophenylmercaptopyrimidine (35.5 g.) and N-carbethoxypiperazine (89 ml.) was heated under reflux for 1.5 hours. On chilling, the mixture solidified. It was drowned in water and filtered. The precipitate was recrystallized from 66% ethanol, yielding 2-amino-4-N'-carbethoxypiperazino-5-p-chlorophenylmercaptopyrimidine, melting point 165° C. This compound (5 g.) was mixed with ethanol (525 ml.) in which was dissolved sodium hydroxide (50 g.). The mixture was refluxed on the steam bath for 17 hours. Most of the ethanol was evaporated off, water was added, and the crystalline precipitate was filtered off and recrystallized from ethanol to give 2-amino-4-piperazino-5-p-chlorophenylmercaptopyrimidine, which melted at 160° C.

EXAMPLE 15

2-Amino-4-Diethylaminoethylamino-5-p-Chlorophenyl-mercaptopyrimidine

A mixture of 2-amino-4-chloro-5-p-chlorophenylmercaptopyrimidine (10 g.) and diethylaminoethylamine (25 ml.) was refluxed for one hour. Upon mixing with water, a gummy precipitate formed which did not crystallize. This was dissolved in absolute ethanol and converted to a sulphate. 2-amino-4-diethylaminoethylamino-5-p-chlorophenylmercaptopyrimidine sulphate was obtained as a syrup. After boiling in ethanol, it crystallized as needles which melted to a glass at 120° C.

EXAMPLE 16

2-Amino-4-Dimethylamino-5-p-Chlorophenylmercapto-pyrimidine

2 - amino - 4 - chloro-5-p-chlorophenylmercaptopyrimidine (15 g.) was added to a 33% solution of dimethylamine in ethanol (75 ml.) and heated in a glass-lined autoclave at 130° C. for 16 hours. Upon cooling, a crystalline product was present. This was recrystallized from ethanol, being separated from a small amount of insoluble material, and was converted in ethanol to the hydrochloride salt, 2-amino-4-dimethylamino-5-p-chlorophenylmercaptopyrimidine hydrochloride, melting at 221–224° C.

EXAMPLE 17

2-Amino-4-[N-(2-Dimethylaminoethyl)-Ethylamino]-5-p-Chlorophenylmercaptopyrimidine A mixture of pure 2-amino-4-chloro-5-p-chlorophenylmercaptopyrimidine (2.83 g.) and N,N-dimethyl-N'-ethylethylenediamine (10 ml.) was heated at the boil for 2.5 hours, chilled and poured into an excess of water, which caused the separation of a gum. This was isolated and converted in ethanolic HCl into 2-amino-4-[N-(2-dimethylaminoethyl) - ethylamino]-5-p-chlorophenylmercaptopyrimidine dihydrochloride, which melted at 201–202° C. after recrystallization from ethanol-ether mixtures.

EXAMPLE 18

2,4-Bis-Methylamino-5-(p-Chlorophenylmercapto) Pyrimidine

A mixture of 6.3 g. of 2,4-dichloro-5-(p-chlorophenylmercapto)-pyrimidine and 63 ml. of saturated methylamine in alcohol was heated at 125° for 16 hours in an autoclave. The solvent was removed, and the residue extracted with water, in which it was essentially insoluble. It was then recrystallized once from dilute alcohol, followed by conversion to the hydrochloride, using alcoholic HCl plus ether. White crystals were formed, melting at 229–233°.

EXAMPLE 19

4-(γ-Dimethylaminopropylamino)-5-(p-chlorophenyl-mercapto)Pyrimidine Hydrochloride A 4.2 g. sample of 4-hydroxy-5-(p-chlorophenylmercapto)pyrimidine was chlorinated as described above. The product was then refluxed with 20 ml. of 3-dimethylaminopropylamine for three hours. The excess amine was removed by distillation, and the residue extracted with water. A semi-solid product remained, which did not crystallize on standing. This was dissolved in an ether-alcohol mixture and converted to the hydrochloride by the addition of alcoholic HCl. The product, 4-(γ-dimethylaminopropylamino) _ 5-(p-chlorophenylmercapto)-pyrimidine hydrochloride, slowly crystallized. It was purified by recrystallization twice from ethanol; M.P. 239–246°.

Other 4-alkylaminoalkylamino-5-(p-chlorophenylmercapto)-pyrimidines were prepared by the same technique, and are found in Table I.

EXAMPLE 20

2-Mercapto-4-(N'-Methyl-N-Piperazyl)-5-(p-Chlorophenylmercapto)-Pyrimidine

Five grams of 2-mercapto-4-hydroxy-5-(4'-chlorophenylmercapto)-pyrimidine was refluxed with 50 ml. of phosphorus oxychloride for 1.5 hours, at which time a clear solution was present. After removal of excess phosphorus oxychloride, drowning on ice, and neutralization, there was present a yellow gum, which reacted slowly with excess alkali. This substance was mixed with 30 ml. of N-methylpiperazine, which resulted in an immediate vigorous reaction. The mixture was allowed to stand overnight, and then heated to refluxing for three hours. It was filtered from a slight precipitate and poured into water, followed by neutralization of the resultant solution with acid. A gummy precipitate formed, which slowly crystallized during a three-day period. The product was extracted with a small amount of alcohol, which served to remove gummy material, leaving a white powdery solid, which was then recrystallized from 250 ml. of alcohol. A matte of fine white needles was obtained which melted at 204–206°. The substance (2-mercapto-4-(N'-methylpiperazine) - 5-(p-chlorophenylmercapto)-pyrimidine) dissolved in acid to give a yellow solution, and in alkali to give a colorless solution. Ultraviolet absorption maxima ($E \times 10^3$) were as follows:

λ max (0.1 NHCl); sh 280 (10.6) 358 (7.1)
λ min 330 (6.4)
λ max (ph 11 buffer); 260 (27.2), sh 330 (7.2)

TABLE I

| Ex. No. | R | $R^3$ | $NR^1R^2$ | Ar | M.P., °C. |
|---|---|---|---|---|---|
| 21 | | H | —NH(CH$_2$)$_2$N(CH$_3$)$_2$ | C$_6$H$_4$Cl | 178–181 |
| 22 | | H | —N(CH$_2$CH$_2$)$_2$NCH$_3$ | C$_6$H$_4$Cl | 109 |
| 23 | NH$_2$ | H | —NHCH$_3$ | C$_6$H$_4$Cl | 144–145 |
| 24 | NH$_2$ | H | —NH(CH$_2$)$_3$OCH$_3$ | C$_6$H$_4$Cl | 102.5–103.5 |
| 25 | NH$_2$ | H | —NH(CH$_2$)$_3$NHC$_3$H$_7$ | C$_6$H$_4$Cl | 112–113 |
| 26 | N(CH$_3$)$_2$ | H | —N(CH$_3$)$_2$ | C$_6$H$_4$Cl | 170–171 |
| 27 | NH$_2$ | H | —N—(CH$_2$)$_5$— | C$_6$H$_4$Cl | 202 |
| 28 | NH$_2$ | H | —N—(CH$_2$CH$_2$)$_2$O | C$_6$H$_4$Cl | 140–141 |
| 29 | N(CH$_3$)$_2$ | H | —N(CH$_2$CH$_2$)$_2$NCH$_3$ | C$_6$H$_4$Cl | 117–119 |
| 30 | N(CH$_2$CH$_2$)$_2$NCH$_3$ | H | N(CH$_2$CH$_2$)$_2$NCH$_3$ | C$_6$H$_4$Cl | 110–111 |
| 31 | NH$_2$ | H | —N(CH$_2$CH$_2$)$_2$NC$_2$H$_4$OH | C$_6$H$_4$Cl | 177 |
| 32 | NH$_2$ | H | 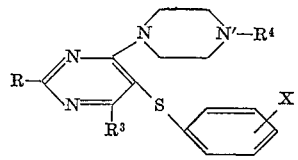 (trans) | C$_6$H$_4$Cl | 215 |
| 33 | NH$_2$ | CH$_3$ | —N(CH$_2$CH$_2$)$_2$NCH$_3$ | C$_6$H$_4$Cl | 152 |
| 34 | NH$_2$ | H | 2'-pyridylamino | Phenyl | 192 |
| 35 | NH$_2$ | H | 6'-methyl-2'-pyridylamino | Phenyl | 196 |
| 36 | NH$_2$ | H | 5'-methyl-2'-pyridylamino | Phenyl | 205–206 |

Since the cation is the therapeutically active moiety of the compounds, the precise nature of the anion is immaterial provided it is therapeutically acceptable. Examples of acceptable anions include hydrochlorides, sulfonates, citrates, succinates, acetates, phosphates and the like.

What we claim is:
1. A compound selected from the class consisting of a base of the formula and its therapeutically acceptable acid addition salts, wherein R is selected from the class consisting of hydrogen, amino and lower alkylamino, $R^3$ and $R^4$ are selected from the class consisting of hydrogen and lower alkyl and X is selected from the class consisting of hydrogen, halogen, lower alkyl and lower alkoxy.

2. 2 - amino - 4 - N' - methylpiperazino - 5 - p - chlorophenylmercaptopyrimidine.
3. 2 - amino - 4 - N' - methylpiperazino - 5 - p - methylphenylmercaptopyrimidine.
4. 2 - amino - 4 - N' - methylpiperazino - 5 - m - methylphenylmercaptopyrimidine.
5. 2 - amino - 4 - N' - methylpiperazino - 5 - o - methylphenylmercaptopyrimidine.
6. 2 - amino - 4 - N' - methylpiperazino - 5 - phenylmercaptopyrimidine.
7. 2 - amino - 4 - N' - methylpiperazino - 5 - trichlorophenylmercaptopyrimidine.
8. 2 - amino - 4 - piperazino - 5 - p - chlorophenylmercaptopyrimidine.

References Cited in the file of this patent
UNITED STATES PATENTS 2,455,396    Adams et al.    Dec. 7, 1948
2,953,567    Hitchings et al.    Sept. 20, 1960

OTHER REFERENCES

Conant: The Chemistry of Organic Compounds, page 269 (1934), 260/Eq. Digest.

Falco et al.: J. Am. Chem. Soc., vol. 73, pages 3753–58 (1951).